Patented May 16, 1939

2,158,760

UNITED STATES PATENT OFFICE 2,158,760

RUBBER HYDROHALIDES AND PROCESSES OF PREPARING THE SAME

Earle H. Morse, Nutley, N. J., and William S. Johnston, New York, and Edward L. Mack, Douglaston, N. Y., assignors to Reynolds Research Corporation, New York, N. Y., a corporation of Delaware No Drawing. Application April 24, 1936,
Serial No. 76,200

28 Claims. (Cl. 260—111)

This invention relates to rubber hydrohalides and processes of preparing the same and it comprises processes wherein rubber is reacted with a hydrogen halide, for example hydrogen chloride, in the presence of a solvent in which the rubber is soluble, or miscible, but in which the rubber hydrohalide is substantially insoluble or immiscible; it further comprises processes wherein the solvent includes an organic solvent for hydrogen halides; it further comprises processes wherein the rubber, prior to reaction with the hydrogen halide, is given a preliminary treatment such as milling or heating; and it further comprises, as new products, a rubber hydrohalide in the form of spongy granules.

In recent years various "derivatives" of rubber have reached some degree of commercial importance. For example, so-called rubber "isomers", made by reacting rubber with catalytic agents have been used in paints, as protective coatings, films, molded articles, binders etc. The chlorinated rubbers have also been found useful in many relations. These chlorinated rubbers are customarily prepared by reacting rubber with chlorine gas. For many years it has been known that rubber would react with hydrogen chloride and hydrogen bromide to yield plastic or horny masses depending upon conditions. However, the preparation of these hydrohalide derivatives has hitherto been extremely difficult for many reasons, and because of the technical difficulties the art turned to chlorine gas. The hydrogen halide derivatives of the rubber would have many commercial uses were these substances readily available in high states of purity. The rubber hydrohalides can be filmed to give films and sheets useful in many relations as a wrapping foil, seals for milk bottles, coating compounds, water-proofing compounds etc. Many of the chlorinated rubbers are not particularly satisfactory for such uses.

Factors which have prevented marked commercial success of the rubber hydrohalides are, as stated, difficulties hitherto experienced in the process steps of making and purifying these materials. Hydrogen chloride is a corrosive gas and hence there have been apparatus difficulties in the past. These have now been overcome by the development of acid-resisting materials, but the more important difficulties with the hydrohalide process, such as the recovery of the final product in a substantially pure state, that is, free of hydrogen halide, by-products, resins, proteins, and other impurities, have been almost unsurmountable.

In common with the process steps used in reacting rubber with free chlorine gas it has generally been the rule to react rubber with hydrogen chloride in the presence of a chlorinated solvent for the rubber. Chloroform has been the more usual solvent, see for instance the Bradley and McGavack patent, 1,519,659. The reason why prior works have used the chlorinated solvents is because both the rubber and the rubber hydrochloride are soluble in chlorinated solvents. Consequently, in accordance with most chemical processes, the reaction would seemingly proceed in a satisfactory manner in the presence of such solvents. And much time and expense have been devoted to trying to make this process commercially feasible. For like reasons benzol has also been proposed as a solvent for both the rubber and the rubber hydrochloride.

One striking disadvantage in prior processes has been the limited solubility of hydrogen chloride in chlorinated solvents, but this has been overcome in part by operating at pressures somewhat above atmospheric. The purifying problem has been extremely perplexing. As a rule the rubber hydrochloride has been recovered by volatilizing the solvent and excess hydrogen chloride from the reaction product. This means, of course, that any impurities, such as proteins, sugars, resins, and the like remain with the rubber hydrochloride and must subsequently be removed therefrom. The difficulty of removing the hydrogen chloride from the final product has been one of the outstanding problems in the art. Excess hydrogen chloride is necessary to force the reaction to completion. If the excess is neutralized the reaction product of the neutralization must be filtered from the viscous solution of rubber hydrochloride, an impractical step. If attempt is made to sweep out the hydrogen chloride with air or an inert gas, much solvent is vaporized and the last traces of hydrogen chloride cannot be removed. Since the rubber hydrochlorides are soluble in chlorinated solvents it was, for a time, felt that the reaction product comprising the hydrochloride dissolved in the solvent could be used directly as a coating compound for the formation of films and the like. This meant, of course, that the impurities remained with the dried film and such films were found to be unsatisfactory. Slight traces of impurities, such as resins, proteins, and sugars associated with the crude rubber, affect the physical and chemical properties of the film markedly.

More recently, as in Patent 1,841,295 to Oenslager, it has been proposed to dispense with chlorinated solvents entirely and, in fact, to dispense with any solvent for the rubber. In that patent, thin sheets of rubber, about one sixteenth inch thick, are dipped in a solution of hydrogen chloride dissolved in a solvent which has no solvent action on the rubber. The hydrogen chloride solution permeates the rubber film during which reaction takes place. All solvents used in the patent are specifically non-solvents for rubber. Ether, a good solvent for rubber, cannot be used except when treating vulcanized rubber which is insoluble in ether. This most recent advance in the art recognizes the inherent disadvantages in the use of chlorinated solvents, but for practical reasons it is apparent that the dipping of thin sheets of rubber in a hydrogen chloride solution is not particularly feasible in large scale production. The penetration of the hydrogen chloride solution through the rubber sheets or films tends to give uneven treatment. The outside layer or surface of the rubber film often has a higher chlorine content than the inner portions of the film. In addition, the rubber must be sheeted or filmed as a preliminary step and the final films or sheets of rubber hydrochloride still contain impurities associated with rubber.

The art may be epitomized by stating that efforts to make hydrochlorides of rubber have been so discouraging that the art has turned to the use of free chlorine gas. Nevertheless, a satisfactory commercial method of making rubber hydrochlorides would open up many commercial uses for these substances and would be of great economic significance.

We have now set ourselves to the problem of providing processes of making rubber hydrohalides which avoid the difficulties inherent in prior processes, and which may be used to prepare products having a high state of purity even as initially formed. In consequence, we need not subject our reaction product to extensive purification processes. This, in itself, is a marked advance in the art. Moreover, in our process, we are able to use cheaper, more available solvents and our solvent recovery operations avoid most of the expensive losses hitherto regarded as a necessary burden.

Our process is based upon the discovery that all of the disadvantages in the treatment of rubber with hydrogen halides are overcome when solvents or combinations of solvents, are chosen which have the property of dissolving, or swelling the rubber but in which the rubber hydrohalide is substantialy insoluble. This means that our reactants, that is rubber and hydrogen chloride for example, are dissolved in an inert organic solution during reaction but the reaction product, rubber hydrochloride, is not. Under advantageous conditions of working our process, rubber hydrochloride precipitates out as a mass of spongy granules from which, at the completion of the process, the supernatant organic solution can be simply decanted. We have discovered that the impurities, such as resins and undesirable by-products, tend to remain in the supernatant liquor, and consequently the precipitate of rubber hydrochloride is practically free of those substances which have resisted removal in processes hitherto practiced. Because of the spongy, granular nature of the precipitate any traces of impurities associated therewith after decanting the mother liquor can be removed by a simple washing operation.

In broad aspects then, our processes comprise reacting rubber with a hydrogen halide, generally hydrogen chloride or hydrogen bromide, while the rubber is mixed with a solvent or combination of solvents in which the rubber is soluble, but in which the reaction product, rubber hydrochloride, is substantially insoluble. When speaking of rubber solutions both solutions of rubber in the solvent, and solutions of solvent in the rubber are intended to be comprised in the term "solvent dissolving the rubber". As is well known in the art, solutions consisting of rubber and a solvent therefor may have most of the rubber actually dissolved or swollen by the solvent but some authorities consider that the rubber may possibly dissolve the solvent to some extent. In any event the solvent first swells the rubber and, as more solvent is taken up, the solution becomes viscous and finally fluid. We note this at the present time so that it shall be understood that in speaking of solvents for rubber we mean to include those organic liquids which swell the rubber to form solutions or dispersions thereof.

There are many organic solvents which can be used in our invention. Generally we use, as a basic solvent, an ordinary aliphatic hydrocarbon such as a gasoline fraction, or ordinary gasoline. We avoid the use of highly unsaturated hydrocarbons since they react with hydrogen chloride. We can, however, use ordinary gasoline even though it contains a proportion of unsaturated hydrocarbons since, under the conditions of our process, the hydrogen chloride is far more reactive with rubber than with the unsaturated hydrocarbon. We do not ordinarily use aromatic hydrocarbons such as benzol because these solvents will either dissolve or swell rubber hydrochloride. Likewise, we do not use chlorinated solvents which dissolve rubber hydrochloride. We can use many oxygenated solvents but only if the solvent will dissolve or swell rubber. The ethers are particularly good solvents for use in our process since they dissolve the rubber and have good solvent action on hydrogen chloride, but do not dissolve or swell rubber hydrochloride. Although we find it best to use solvents which, alone, have no solvent action on rubber hydrochloride, we can use combinations of solvents in which one of the ingredients may have a solvent action on rubber hydrochloride but the mixture as a whole will not. Thus, for example, we can use a mixture of ether and benzol in such proportions that the mixture, while dissolving rubber, will not dissolve any substantial amount of rubber hydrochloride. In this case the solvent action of benzol for rubber hydrochloride has been reduced by the addition of ether. But our solvents, or solvent mixtures all dissolve rubber. Whether a solvent or combination of solvents, will be suitable for use in our process can be readily determined by anyone skilled in the art by a simple experiment. If the proposed solvent, or solvent mixture dissolves or swells rubber without dissolving or swelling rubber hydrochloride, or other rubber hydrohalide, it can be used. In making this test all that is necessary is to determine the solvent or swelling action of the proposed solvent on a small quantity of rubber and on a small quantity of rubber hydrochloride and, of course, the solvent should not react with hydrogen chloride under the conditions of our process. The paraffinic hydrocarbon solvents such as gasoline can be called "basic" solvents in our process. In practically all instances we find it better to use these hydrocarbon solvents. They are not particularly good solvents for hydrogen chloride, however, and we can advantageously incorporate with the hydrocarbon solvent an amount of ether, more especially isopropyl ether, to increase the quantity of hydrogen chloride dissolved in the solvent mixture. Or, we can increase the solubility of the hydrogen chloride by increasing the pressure or decreasing the temperature in the reaction mixture.

Ordinarily we do not use vulcanized rubber in our process. Because of its sulfur content, vulcanized rubber introduces disadvantages but we can use reclaimed rubber from which most of the sulfur has been removed. In general, however, we prefer to use ordinary crude sheet rubber as obtainable in the open market; and in most instances we simple dissolve or swell the crude rubber in one or more of the solvents described above and then pass in hydrogen chloride with agitation as will be described in detail.

We shall now give examples of advantageous ways of practising our invention. In order to keep our specific examples within reasonable bounds we shall restrict them to the use of hydrogen chloride, it being understood, however, that other hydrogen halides hitherto used in the art can be used in our process.

We first prepare a mixture of rubber and rubber solvent. Advantageously this is made by dissolving about 150 parts of rubber in about 1000 parts by weight of a mixture consisting of 80 percent heptane and 20 percent isopropyl ether. Solution of the rubber is somewhat facilitated if it is cut up in rather small pieces. The rubber solution is then cooled to a temperature of about 15° C. and hydrogen chloride gas passed in under a slight pressure above atmospheric. During the introduction of the hydrogen chloride it is advantageous to agitate the reaction mixture. Under these conditions the reaction mixture becomes quite viscous and as the introduction of hydrogen chloride continues, rubber hydrochloride precipitates. Hydrogen chloride is added until no further precipitation occurs. The reaction mixture, now composed of precipitated rubber hydrochloride and supernatant solvent mixture, is treated with a small amount of lime or other alkali such as ordinary soda ash to neutralize any hydrogen chloride present. The actual amount of neutralizing agent will, of course, vary with conditions but it does no harm to have an excess present. Thereupon the precipitate is separated from the mother liquor by decantation, filtering, or centrifuging. Water is then added to the granules and the mass of rubber hydrochloride mixture steam-distilled, until free of all traces of solvent. This steam distillation can be done in the usual way for removing volatile solvents from solid materials. It is advantageous to steam-distil under a slight vacuum, such that the water distils at about 180° F. This prevents any tendency for the particles of rubber hydrochloride to stick together. The rubber hydrochloride is again filtered to free it of water present during the steam distillation, the filter cake washed with fresh water until free of soluble chlorides, and the rubber hydrochloride finally dried in warm air or in vacuo.

The dry powder thus obtained is a practically neutral solid, light in color, and readily soluble in chloroform or other solvents for rubber hydrochloride. It is substantially stable and may be kept indefinitely in closed vessels. There are no difficulties in storing, shipping or dissolving it. It has a chlorine content of from about 26 to 33 percent, generally averaging about 29 to 31 percent. The theoretical chlorine content of rubber dihydrochloride is about 34 percent. Our final products may possibly consist of a mixture of mono and dihydrochlorides.

In the foregoing example we have included isopropyl ether in the solvent mixture. We use ethers primarily for the purpose of increasing the amount of hydrogen chloride which can be dissolved in the reaction mixture. The ethers are good solvents for hydrogen chloride. Hence the rate of reaction is somewhat increased due to the use of this expedient. We can, however, and frequently do, omit the use of any solvent which is added for the purpose of increasing the solubility of hydrogen chloride. Thus, for example, we can dissolve the rubber in heptane or other hydrocarbon fraction such as hexane or gasoline and pass in hydrogen chloride gas. The rubber hydrochloride precipitates and can be worked up as described above. When using straight hydrocarbon solvents, we find it best to work under pressures of about 3 atmospheres since the pressure on the hydrogen chloride increases its solubility and speeds up the reaction markedly. We can even increase the pressure to as much as 10 or more atmospheres with advantage. These high pressures increase the reaction rate and when a final product in the form of a fine powder is desired it is better to agitate the reaction mixture quite vigorously. Otherwise the rubber hydrochloride may precipitate as flakes or clumped masses. This physical form is not objectionable however.

We can use various solvents for the purpose of increasing the solubility of the hydrogen chloride. The ethers are particularly suitable and one of the best is diethyl ether because of its availability. For practical reasons, isopropyl ether is somewhat better, however, because its boiling point is close to that of heptane. This means that solvent recovery operations are somewhat simplified and we can distil solvent for reuse without encountering difficulties. We may also use other ethers: for example, ethylene oxide or dioxane.

The mother liquor decanted from the precipitate of rubber hydrochloride can be directly used for dissolving further quantities of rubber to be converted to rubber hydrochloride. We need not distil the solvent after each batch treatment, but we do distil the solvent to free it from impurities which have accumulated therein after it has been used for the solution and conversion of five or six rubber batches.

In the foregoing specific example, we have mentioned the use of agitation. If no agitation is employed we find that as hydrogen chloride gas reacts with the rubber in solution the rubber hydrochloride forms as a gel or spongy cake which tends to occupy a substantial volume of the reaction mixture. This gel seems to have a sort of honeycomb structure in which the interstices or cells are occupied by the solvent for the rubber. When agitation is used during the introduction of the hydrogen chloride this gel-like honeycomb structure is broken down so that the rubber hydrochloride collects as finely divided granules in the bottom of the reaction vessel. Most probably, agitation simply prevents the formation of a gel which would form naturally if hydrogen chloride were introduced for a prolonged period of time without substantial agitation. We need not, however, always agitate. The gel exhibits syneresis in common with most colloidal gels, and shrinks as the introduction of hydrogen chloride is continued. We can use the shrunken gel directly without preliminary comminuting if desired. For example, we can simply dissolve the gel in chloroform and film the solution.

The temperature of the hydrogen chloride treatment is subject to rather wide modification but we do not ordinarily operate at temperatures much in excess of 20° to 30° C. For one reason the solubility of hydrogen chloride in the reaction mixture decreases rapidly as the temperature is raised. Undesirable by-products may also form and there are no material advantages in operating at temperatures above room temperature. In fact, from about 5° to 15° C. is a more advantageous temperature range. The final character of the precipitate of rubber hydrochloride can be controlled and is governed by factors such as the rate of addition of hydrogen chloride, the temperature, the degree of agitation, and also by the character of the rubber starting material, a feature which we shall presently describe.

Frequently we find it advantageous to submit the rubber to a pre-treatment prior to dissolving it in the solvent. Our method of preparing rubber hydrochloride gives us a final product which has a much lighter color than that produced by the process of the prior art. In other words, most of the colored impurites hitherto associated with rubber hydrochloride are removed from our product in the supernatant mother liquor. In processes practiced hitherto, it has been common to pre-treat the rubber with acetone or other solvents which would remove resins, colored constituents, proteins, and other substances. We can omit this step entirely in our process and this alone is an important advantage. We do not mean to exclude from our process, however, the use of solvents such as acetone for the preliminary purification of the rubber itself. Although in most instances we have no occasion to use these preliminary purification processes we can, of course, do so when the rubber is particularly "dirty." Some rubbers may contain extremely high quantities of rubber resins and colored constituents and in such instances it will, of course, be obvious that we can preliminarily purify the rubber.

We have, however, discovered that there are marked advantages when the rubber is submitted to either a preliminary milling or heat treatment. We have discovered that a highly milled rubber gives us a rubber hydrochloride which, when dissolved in chloroform or other solvent therefore, gives a solution having a viscosity much lower than that of rubber hydrochloride solutions containing the same amount of hydrochloride but in which the original rubber has not been subjected to the milling treatment. For example, we can mill 155 grams of rubber for about 15 minutes on a rubber mill having 5 inch diameter rolls rotating at approximately 27 revolutions per minute. This quantity of milled rubber when dissolved in about 1000 grams of the mixed heptane and isopropyl ether solvent described above yields a final rubber hydrochloride which gives us a solution having a much lower viscosity than that from rubber hydrochloride made in the same way but from rubber which has not been milled as described. Somewhat similar improvement in viscosity lowering is obtained if the rubber prior to solution in the solvent is heated for about 3 to 5 hours at a temperature of about 140° to 170° C. in a closed container to which air is admitted in limited amounts, if at all. Just why milled rubber or preheated rubber gives rubber hydrochloride solutions of much lower viscosity is not clearly understood. Undoubtedly highly complex colloidal chemical reactions are involved, and the milling or heating probably changes the size of the molecular aggregates in such a way that the final rubber hydrochloride particles have a somewhat smaller aggregate particle size when dissolved in the solvent. Whether this be the true explanation we cannot say with any degree of definiteness.

Consequently, final particle size in the product is also dependent somewhat upon whether the rubber has been pretreated as described above. Agitation, however, seems to be the more controlling factor in particle size.

In the foregoing example we have more specifically referred to adding alkaline purifying agents directly to the rubber hydrochlrode-rubber solvent reaction mixture. As a modification of this purification method we can, of course, remove the precipitated rubber hydrochloride from the reaction mixture, dissolve the hydrochloride in a suitable solvent such as a chlorinated organic solvent or benzol, add lime or soda ash, agitate, and filter off the lime. These materials function to remove any free hydrochloric acid. Purified rubber hydrochloride can, of course, be recovered from the solvent solution by simple distillation of the solvent, preferably aided by steam. Or the solution of rubber hydrochloride, after removal of lime by filtering can be directly used for the formation of films as we shall describe.

In a modification of our invention we proceed as follows. After the rubber hydrochloride has been prepared in the reaction mixture, the mother liquor or rubber solvent is decanted, water is added to the rubber hydrochloride and the mass steam distilled until the vapors are substantially free of hydrogen chloride and rubber solvents. The rubber hydrochloride is then dried in warm air and dissolved in chloroform or other solvent. A small amount of lime, for example, about ½ percent based on the weight of rubber hydrochloride is then added to neutralize any remaining acidity, the mixture agitated and then filtered to remove the lime. Decolorizing carbons can be used to remove any final traces of color if necessary, and the thus purified solution of rubber hydrochloride used directly for the formation of films.

Although we have referred more specifically to the use of ethers to increase the solubility of hydrogen chloride in the rubber solvents, we do not wish to be limited to the use of this class of compounds. Other solvents such as the alcohols and ketones are useful. Likewise, we need not use petroleum hydrocarbon solvents for the rubber. We can use isopropyl ether, for example, or other ethers such is diethyl, and in this way obtain the benefits of a rubber solvent plus a good solvent for hydrogen chloride. For matters of economy, however, we find it somewhat better to use the petroleum hydrocarbon solvents in admixture with somewhat lesser quantities of a specific solvent for the hydrogen chloride. It is contemplated, however, that solvents or combinations of solvents having superior solvent action for rubber, and superior action for rubber hydrochloride are now available or will be and our invention specifically includes the use of such solvent materials. The hydrogen chloride solvent in the mixed solvent need not necessarily be a good rubber solvent, and it may even partially dissolve rubber hydrochloride. In such cases we regulate the quantities of rubber solvent (such as heptane) and hydrogen chloride solvent so that the combined solvent will dissolve rubber and hydrogen chloride, but will not dissolve any substantial amount of rubber hydrochloride.

Apparatus useful in our process consists of ordinary reaction vessels lined with acid resistant materials and provided with agitating devices. It is obvious that various structural types can be used.

We consider our final products to be new materials and claim them in the appended claims. The spongy granules of rubber hydrohalide have many advantages. Rubber hydrohalides hitherto obtained have been either in the form of sheets or films made by evaporating the reaction solution, or in the form of flakes made by pouring the reaction solution into a large volume of alcohol or other non-solvent for the rubber hydrochloride. Material in sheet or flake form does not dissolve readily and is difficult to purify.

Because of the spongy, porous character of our product we can wash it with water or other purifying agents readily and we can dissolve it in solvents quickly. The spongy material can also be comminuted easily since the sponge-like, porous, horny granules are quite friable.

We shall now describe uses for our rubber hydrohalides.

Our products are especially useful in making films, sheets, threads, bands, etc., from solutions of the rubber hydrohalide. For example, we dissolve the halide in a suitable solvent such as benzene or chloroform and film the solution on to a support to form films from which the solvent evaporates and leaves a solvent-free film which can be stripped from the support.

According to one method of preparing a transparent film from the rubber hydrochloride produced by our process, the purified and dried rubber hydrochloride is dissolved in chloroform, about ten parts of solvent to one part of rubber hydrochloride being satisfactory. Other solvents, as, for example, benzene may be employed if the materials are heated. Still other solvents of a chlorinated character such as dichlorethylene and dichlormethane may be used with heating. The solution thus formed may be used direct for the preparation of film or the solution may be further clarified by the addition of a small quantity of hydrated lime, as, for example, 1 percent of the weight of rubber hydrochloride contained in the solution to be treated. The clarified solution is then filtered to remove the excess of hydrated lime and is ready for the preparation of film. Satisfactory results have been obtained by spreading the solution on the cylindrical surface of a nickel-plated drum and then evaporating the solvent by circulating warm air over the surface, stripping the resultant film from the drum after substantially all of the solvent has been evaporated, and subsequently evaporating the balance of the solvent. The solution may be applied to the surface of the drum by extrusion from an orifice or by transferring from the surface of a coating roller. The thickness of the film may be varied as desired.

Film so produced is very resistant to the action of water, alcohol, oils, and greases, and forms a most advantageous wrapping material, bottle caps etc. The film is also resistant to the transmission of water vapor. In several experiments, we have observed transmission of as little as ten grams of water vapor per square meter per 24 hours through a film having an approximate thickness of .001 inch.

It will be understood that many variations may be made in the steps of the process of preparing the film, and many different solvents may be employed. Concentration of the rubber hydrochloride solution used in forming the film may be varied within limits, depending upon the inherent viscosity characteristic of the rubber hydrochloride. We prefer to use chloroform solutions containing 5 to 15 percent by weight of rubber hydrochloride.

A solution of rubber hydrochloride in chloroform or in benzene forms a very desirable composition for coating paper or other fibrous materials to make them moisture-resistant and oil-proof. Paper or other fibrous materials may be dipped directly into the coating composition, or the coating composition may be applied by a spreader, coating roller, extrusion nozzle, or other suitable device. Fabricated paper articles such as containers may be sprayed with the coating composition or dipped thereinto. Paper so coated may be used in the manufacture of oil containers and milk containers, bottle caps etc.

Threads can be prepared by extruding the solution through suitable dies as in the manufacture of artificial silk. Sheets of the rubber hydrochloride can be laminated to form built-up articles and the rubber hydrochloride, in powdered form, can be molded under heat and pressure.

In the appended claims we use the word "solvent" in a generic sense to include both single solvents, and mixtures of two or more liquids, the solvent mixture having a solvent action on rubber but not on the rubber hydrohalide.

Having thus described our invention what we claim is:

1. In the process of preparing rubber hydrohalides, the method of preparing such rubber hydrohalides in precipitated form which comprises reacting the hydrogen halide with the rubber while the rubber is dissolved in a solvent for the rubber, in which a rubber hydrohalide is insoluble, continuing the reaction until the halogen content of the rubber hydrohalide being formed is such that the rubber hydrohalide becomes insoluble in the solvent, and precipitation occurs, and separating the precipitated rubber hydrohalide from the reaction solution.

2. In the process of preparing hydrochlorides, the method of preparing such rubber hydrochlorides in precipitated form which comprises reacting hydrogen chloride with the rubber while the rubber is dissolved in a solvent for the rubber, but in which a rubber hydrochloride is insoluble, continuing the reaction until the halogen content of the rubber hydrochloride being formed is such that the rubber hydrochloride becomes insoluble in the solvent, and precipitation occurs, and separating the precipitated rubber hydrochloride from the reaction solution.

3. In the process of preparing rubber hydrohalides, the method of preparing such rubber hydrohalides in precipitated form which comprises reacting the hydrogen halide with the rubber while the rubber is dissolved in a solvent for the rubber, but in which a rubber hydrohalide is insoluble, continuing the reaction with agitation of the reaction mixture until the halogen content of the rubber hydrohalide being formed is such that the rubber hydrohalide becomes insoluble in the solvent, and precipitation occurs, and separating the precipitated rubber hydrohalide from the reaction mixture.

4. In the process of preparing rubber hydrochlorides, the method of preparing such rubber hydrochlorides in precipitated form which comprises reacting hydrogen chloride with the rubber while the rubber is dissolved in a solvent for the rubber, but in which a rubber hydrochloride is insoluble, continuing the reaction with agitation of the reaction mixture until the chlorine content of the rubber hydrochloride being formed is such that the rubber hydrochloride becomes insoluble in the solvent, and precipitation occurs, and separating the precipitated rubber hydrochloride from the reaction mixture.

5. In the process of preparing rubber hydrohalides, the method of preparing such rubber hydrohalides in precipitated form which comprises reacting the hydrogen halide with the rubber while the rubber is dissolved in a solvent for the rubber, but in which a rubber hydrohalide is insoluble, continuing the reaction until the halogen content of the rubber hydrohalide being formed is approximately 26% to 33% and the rubber hydrohalide becomes insoluble in the solvent, and separating the insoluble rubber hydrohalide from the reaction mixture.

6. In the process of preparing rubber hydrochlorides, thee method of preparing such rubber hydrochlorides in precipitated form which comprises reacting hydrogen chloride with the rubber while the rubber is dissolved in a solvent for the rubber, but in which a rubber hydrochloride is insoluble, continuing the reaction until the chlorine content of the rubber hydrochloride being formed is about 26% to 33% and the rubber hydrochloride becomes insoluble, and separating the insoluble rubber hydrochloride from the reaction mixture.

7. The process as in claim 1 wherein the rubber, prior to dissolving in the solvent, is pre-treated by milling.

8. The process as in claim 2 wherein the rubber before being dissolved in the solvent, is pre-treated by milling.

9. The process as in claim 1 wherein the solvent comprises an aliphatic hydrocarbon solvent for rubber.

10. The process as in claim 2 wherein the solvent comprises an aliphatic hydrocarbon solvent for rubber.

11. The process as in claim 1 wherein the solvent for the rubber comprises heptane.

12. The process as in claim 2 wherein the solvent for the rubber comprises heptane.

13. The process as in claim 1 wherein the solvent comprises an aliphatic ether solvent for rubber.

14. The process as in claim 2 wherein the solvent comprises an aliphatic ether solvent for rubber.

15. The process as in claim 1 wherein the solvent comprises a mixture of an aliphatic solvent for rubber and an ether.

16. The process as in claim 2 wherein the solvent comprises a mixture of an aliphatic solvent for rubber and an ether.

17. The process as in claim 1 wherein the solvent comprises a mixture of heptane and isopropyl ether for rubber.

18. The process as in claim 2 wherein the solvent comprises a mixture of heptane and isopropyl ether for rubber.

19. As a new material a rubber hydrohalide containing approximately 26% to 33% of halogen, being in the form of spongy granules, and having been precipitated from a solution of rubber in a solvent therefor in which a rubber hydrohalide having a halogen content of 26% to 33% is substantially insoluble.

20. The material as in claim 19 in which the rubber hydrohalide is rubber hydrochloride.

21. The process as in claim 1 in which the solvent comprises a hydrocarbon solvent for rubber but in which the formed rubber hydrohalide is not soluble.

22. The process as in claim 2 in which the solvent comprises a hydrocarbon solvent for rubber but in which the formed rubber hydrochloride is not soluble.

23. The process as in claim 1 in which the solvent comprises an aromatic hydrocarbon solvent for rubber in which the formed rubber hydrohalide is not soluble.

24. The process as in claim 2 in which the solvent comprises an aromatic hydrocarbon solvent for rubber but in which the formed rubber hydrochloride is not soluble.

25. The process as in claim 1 in which the solvent comprises an aromatic hydrocarbon solvent for rubber and an ether.

26. The process as in claim 2 in which the solvent comprises an aromatic hydrocarbon solvent for rubber and an ether.

27. The process as in claim 1 in which the solvent comprises benzol and ether.

28. The process as in claim 2 in which the solvent comprises benzol and ether.

EARLE H. MORSE.
WILLIAM S. JOHNSTON.
EDWARD L. MACK.